United States Patent Office 3,390,927
Patented July 2, 1968

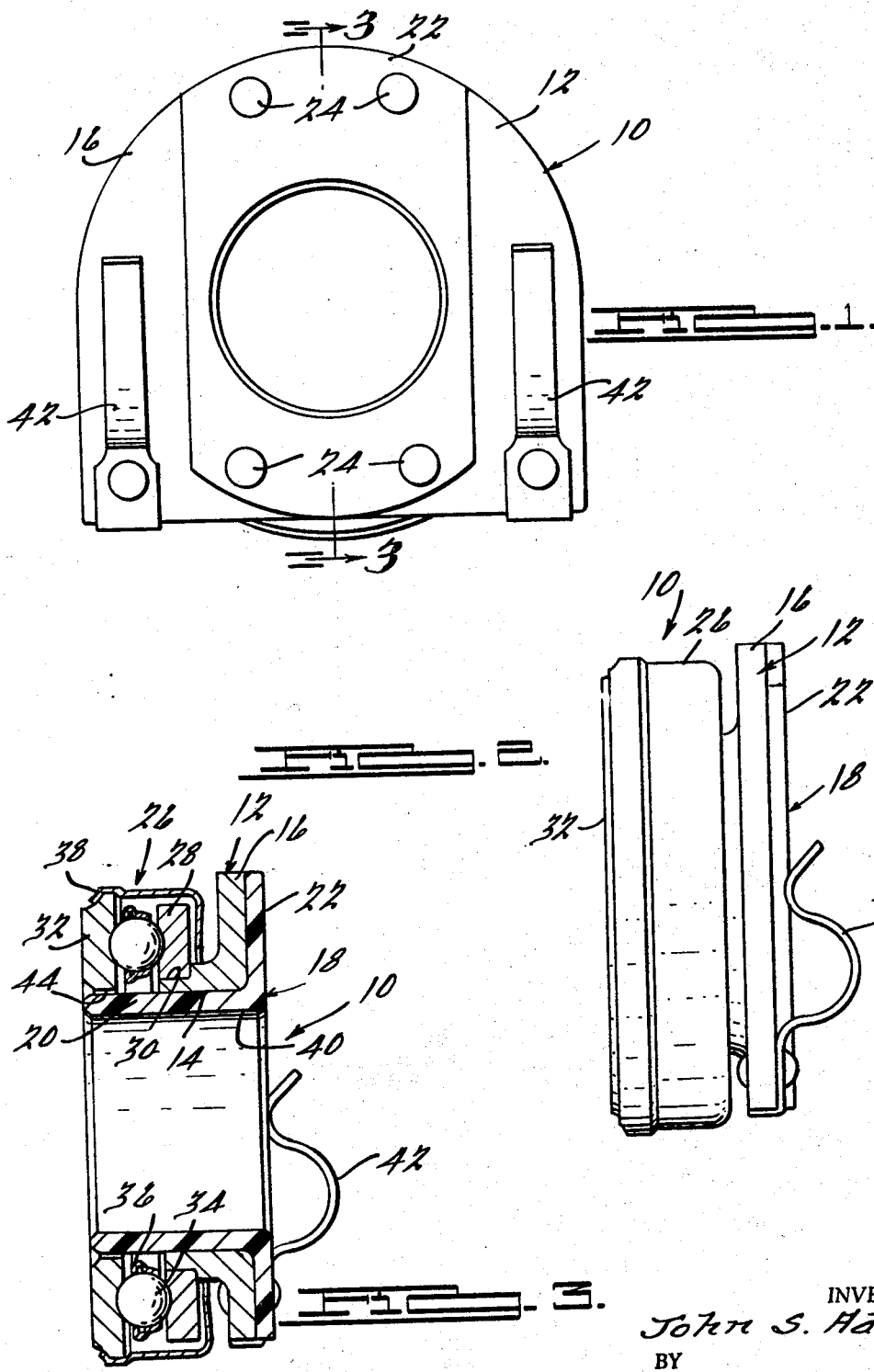

3,390,927
CLUTCH RELEASE BEARING
John S. Adams, Lancaster, Pa., assignor to Federal-Mogul Corporation, Detroit, Mich., a corporation of Michigan
Filed Oct. 23, 1965, Ser. No. 503,062
6 Claims. (Cl. 308—135)

ABSTRACT OF THE DISCLOSURE

A clutch release bearing having a thrust bearing and providing a sleeve member having good lubricity for guiding one of the bearing race members while eliminating the need for lubrication relative to the shaft upon which the release bearing is supported.

---

The present invention relates to clutch release bearings.

It is an object of the present invention to provide a new and improved construction for a clutch release bearing.

In conventional clutch release bearings a grease retaining ring known in the trade as a ferrule and made from a bearing material such as bronze or brass is provided between the bearing and the shaft or hub upon which it is mounted to prevent the lubricant required by the bearing from entering the clutch. In the present invention no such grease retaining ring is required. Therefore it is another object of the present invention to provide a clutch release bearing in which no grease retainer is required between the bearing and the shaft upon which it is mounted. It is also an object of the present invention to provide an improved clutch release bearing which is smoother in operation, is quieter and has a longer life.

It is a general object of this invention to provide an improved clutch release bearing.

Other objects, features, and advantages of the present invention will become apparent from the subsequent description and the appended claims, taken in conjunction with the accompanying drawings, in which:

FIGURE 1 is a front elevational view of a clutch release bearing assembly embodying the features of the present invention;

FIGURE 2 is a left side elevational view of the assembly of FIGURE 1; and

FIGURE 3 is a sectional view of the assembly of FIGURE 1 taken substantially along the line 3—3.

Looking now to the drawing, a clutch release bearing assembly is generally indicated by the numeral 10 and includes a metallic tubular body member 12 having a central bore 14 and a radially extending flange 16 at its rearward end. A tubular insert 18 has a tubular portion 20 which is matably received in and extends through the bore 14 and also has a flange 22 which is engageable with the flange 16. The insert 18 is secured to the body member 12 by means of a plurality of rivets 24. Insert 18 may also be bonded to body member 12 by molding or casting the two members together so that they are permanently affixed to each other. A thrust bearing assembly 26 has an axially inner race member 28 which is frictionally fixed to an annular seat 30 at the outer extremity of the body member 12 and which is axially spaced from an axially outer race member 32. A plurality of balls 34 which are held in a cage 36 are located between the races 28 and 32. An annular housing 38 is fixedly secured to the radially outer edge of the outer race 32 and generally extends over the balls 34 and cage 36 and extends over the rear race 28 whereby the race members 28, 32 are generally held together. Note that there is a small running clearance between the outer race 32 and the extremity of the tubular portion 20 of the insert 18. The confines of the thrust bearing 26 are normally filled with a lubricant such as grease. Usually a grease retaining ring is attached to bore 44 of outer race 32. With the construction shown, the grease retaining ring is not required, the outer bore 44 having a very small clearance with tubular portion 20 sufficient to prevent loss of lubrication. Furthermore, this small running clearance improves the concentric relationship between outer race 32 and insert 18 during operation. Therefore, it has been found that the clutch release bearing of the present invention is smoother and quieter in operation and has a longer life in comparison to conventionally constructed release bearings.

The tubular insert 18 has a central bore 40 whereby the assembly 10 can be located upon a shaft. In conventional clutch release bearing constructions, the structure as defined by the insert 18 and the tubular body 12 normally would be of a unitary structure. In such constructions, normally a solid metallic material is utilized and hence lubrication is required between the central bore and the shaft. In the construction as shown, the insert 18 is made of a plastic having good lubricity characteristics such as phenolic resin impregnated with Teflon and hence lubrication is not required. When the insert is made of plastic not having adequate strength the tubular body is made of metal to provide the necessary strength for the assembly. Other materials which do not require wet lubrication could be utilized for the insert 18; i.e., an oil impregnated sintered bronze metal alloy. With the bearing construction as shown, no grease lubrication is required and hence there can be no problem as to loss of lubrication or leakage of lubricants into the clutch housing, etc.

A pair of clips 42 are riveted or otherwise secured to the flange 16 of the body member 12 and are utilized in a conventional manner to facilitate axial movement of the thrust bearing upon its associated shaft.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. In a clutch release bearing adapted to be mounted on a shaft, the improvement comprising: a thrust bearing assembly, said bearing assembly including a pair of race members having axially facing raceways, a body assembly, said body assembly comprising a tubular body member having a tubular section with a flange at one end and an insert having a tubular portion extending coaxially through and beyond said tubular section and having a flanged portion engageable with said flange, said tubular portion adapted to matably receive the shaft and being constructed of a material having good lubricity characteristics whereby external lubrication between the shaft and said tubular portion from a source independent of said tubular portion is not required, means for securing said flanged portion and said flange together and means for securing said bearing assembly onto said tubular section of said body member.

2. The bearing of claim 1 with said tubular portion being constructed of a plastic having good lubricity characteristics such as a plastic resin impregnated with Teflon.

3. The bearing of claim 1 with said tubular portion being constructed of an oil impregnated sintered bronze metal alloy.

4. In a clutch release bearing adapted to be mounted on a shaft, the improvement comprising: a thrust bearing assembly, said bearing assembly including a pair of race members having axially facing raceways, a body assembly, said body assembly comprising a tubular body member having a tubular section with a flange at one end and an insert secured to said body member at said flange and having a tubular portion extending coaxially through said tubular section and adapted to matably receive the shaft and being constructed of a material having good lubricity characteristics whereby external lubrication between the shaft and said tubular portion from a source independent of said tubular portion is not required, and means for securing said bearing assembly onto said tubular section of said body member.

5. In a clutch release bearing adapted to be mounted on a shaft, the improvement comprising: a tubular portion adapted to matably receive the shaft, body assembly, a thrust bearing assembly supported on said body assembly, and including an inner race member fixedly secured to said body assembly and an outer race member rotatably secured to said inner race member, said inner and outer race members having generally axially facing raceways, said outer race member having an inside diameter surface located over said tubular portion with a small clearance sufficient to prevent loss of lubricant from within said bearing assembly whereby the need for a seal is eliminated.

6. The clutch release bearing of claim 5 with said tubular portion being constructed of a material having good lubricity characteristics whereby the contact between said tubular portion and the shaft can be maintained without external lubrication.

References Cited

UNITED STATES PATENTS

| | | | |
|---|---|---|---|
| 2,387,602 | 10/1945 | Murden | 308—233 |
| 2,995,406 | 8/1961 | Pitner. | |
| 3,155,439 | 11/1964 | Guzewicz | 308—241 |
| 3,286,802 | 11/1966 | Fadler et al. | 192—98 |
| 3,298,753 | 1/1967 | Eaton | 308—238 X |

FOREIGN PATENTS 1,189,810  3/1965  Germany.

MARTIN P. SCHWADRON, *Primary Examiner.*

FRANK SUSKO, *Examiner.*

R. F. HESS, *Assistant Examiner.*